(12) United States Patent
Endo

(10) Patent No.: US 11,186,294 B2
(45) Date of Patent: Nov. 30, 2021

(54) IN-VEHICLE TIMING CONTROLLER AND VEHICLE USING THE SAME

(71) Applicant: ROHM CO., LTD., Kyoto (JP)

(72) Inventor: Hiroharu Endo, Kyoto (JP)

(73) Assignee: ROHM CO., LTD., Kyoto (JP)

( * ) Notice: Subject to any disclaimer, the term of this patent is extended or adjusted under 35 U.S.C. 154(b) by 76 days.

(21) Appl. No.: 16/059,359

(22) Filed: Aug. 9, 2018

(65) Prior Publication Data
US 2019/0047590 A1 Feb. 14, 2019

(30) Foreign Application Priority Data
Aug. 10, 2017 (JP) .............................. JP2017-155322

(51) Int. Cl.
*B60W 50/14* (2020.01)
*G06T 1/20* (2006.01)
(Continued)

(52) U.S. Cl.
CPC .......... *B60W 50/14* (2013.01); *B60W 50/085* (2013.01); *G06T 1/20* (2013.01); *G06T 3/4007* (2013.01); *G09G 3/2096* (2013.01); *B60K 2370/11* (2019.05); *B60K 2370/52* (2019.05); *B60W 2050/146* (2013.01); *G09G 2310/08* (2013.01); *G09G 2330/08* (2013.01); *G09G 2370/08* (2013.01); *G09G 2370/14* (2013.01); *G09G 2370/20* (2013.01); *G09G 2380/10* (2013.01)

(58) Field of Classification Search
CPC ............... B60W 50/14; B60W 50/085; B60W 2050/146; G06T 1/20; G06T 3/4007; G09G 3/2096; G09G 2310/08; G09G 2330/08; G09G 2370/08; G09G 2370/14; G09G 2370/20; G09G 2380/10; B60K 2370/11; B60K 2370/52
See application file for complete search history.

(56) References Cited

U.S. PATENT DOCUMENTS

2008/0061956 A1* 3/2008 Takeuchi ................. B60Q 1/42
340/476
2008/0284768 A1* 11/2008 Yoshida ............... G09G 3/2022
345/208
(Continued)

FOREIGN PATENT DOCUMENTS

| CN | 103837707 A | * | 6/2014 |
| JP | 2006232199 A | | 9/2006 |
| JP | 2010225235 A | | 10/2010 |

OTHER PUBLICATIONS

English translation of Sun Jingwu (CN-103837707-A) (Year: 2014).*

*Primary Examiner* — Bao Long T Nguyen
*Assistant Examiner* — Bakari Underwood
(74) *Attorney, Agent, or Firm* — Cantor Colburn LLP

(57) ABSTRACT

There is provided an in-vehicle timing controller, which includes a main input interface configured to receive input image data from an image processor, an input pin configured to receive a vehicle signal indicating a state of a vehicle from the vehicle, a sub image generator configured to generate sub image data based on the vehicle signal, and an image processing circuit configured to generate output image data to be displayed on a display panel based on at least one of the input image data and the sub image data.

13 Claims, 9 Drawing Sheets

(51) Int. Cl.
*G06T 3/40* (2006.01)
*B60W 50/08* (2020.01)
*G09G 3/20* (2006.01)

(56) References Cited

U.S. PATENT DOCUMENTS

| | | | |
|---|---|---|---|
| 2009/0179918 A1* | 7/2009 | Lai | G01S 7/04 345/629 |
| 2012/0127145 A1* | 5/2012 | Jang | G09G 3/20 345/211 |
| 2016/0027146 A1* | 1/2016 | Kim | G09G 3/3611 345/629 |
| 2017/0262731 A1* | 9/2017 | Uetani | G06T 1/60 |
| 2018/0061308 A1* | 3/2018 | Bae | G09G 5/393 |

* cited by examiner

FIG. 5A
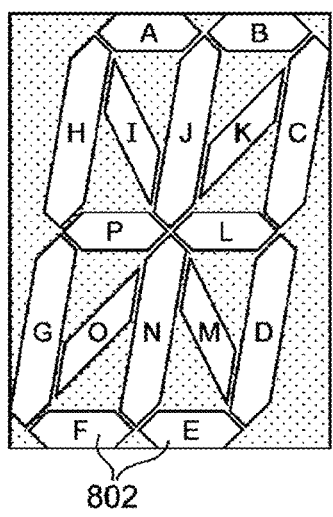
800
802
FIG. 5B
| Bit | 7 | 6 | 5 | 4 | 3 | 2 | 1 | 0 |
|---|---|---|---|---|---|---|---|---|
| Address 0 | H | G | F | E | D | C | B | A |
| Address 1 | P | O | N | M | L | K | J | I |
DATA bit 0:OFF
1:ON
FIG. 5C
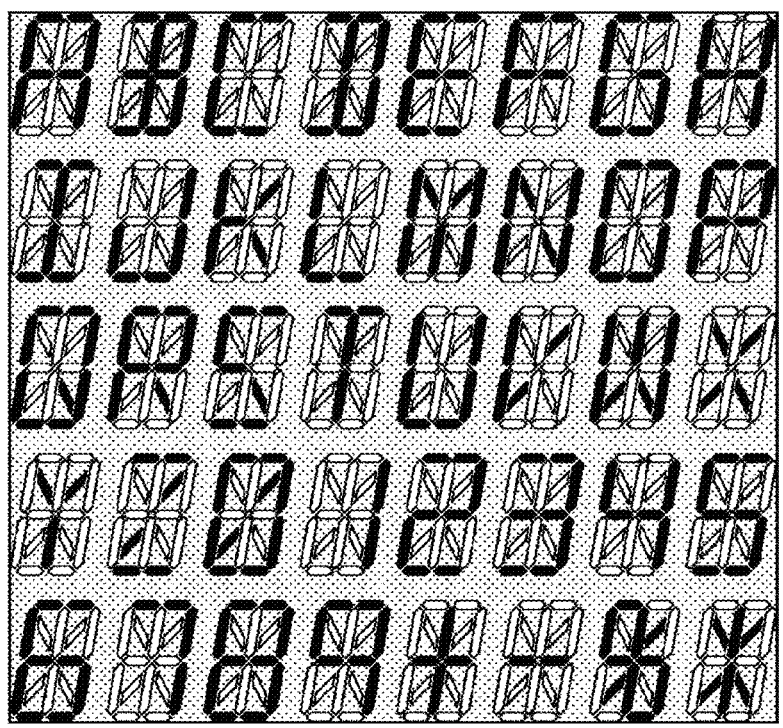

IN-VEHICLE TIMING CONTROLLER AND VEHICLE USING THE SAME

CROSS-REFERENCE TO RELATED APPLICATION

The present application claims priority under 35 U.S.C. § 119 to Japanese Patent Application No. 2017-155322, filed on Aug. 10, 2017, the entire contents of which are incorporated herein by reference.

TECHNICAL FIELD

The present disclosure relates to a timing controller which receives image data from a graphic controller or other devices and transmits information to a gate driver or a source driver.

BACKGROUND

FIG. 1 is a block diagram of an image display system. An image display system 100R includes a display panel 102 such as a liquid crystal panel or an organic EL panel, a gate driver 104, source drivers 106, a graphic controller 110, and a timing controller 200R. The graphic controller 110 generates image data to be displayed on the display panel 102. Pixel (RGB) data included in this image data is transmitted to the timing controller 200R in a serial format.

The timing controller 200R receives the image data and generates various control signals/timing signals (synchronization signals). The gate driver 104 sequentially selects scanning lines Ls of the display panel 102 in synchronization with the signals from the timing controller 200R. The RGB data is also supplied to the source drivers 106.

Generally, the timing controller 200R and the graphic controller 110 are connected by a differential serial interface. The image data cannot be transmitted until a link of the serial interface between the timing controller 200R and the graphic controller 110 is established from the start of activating the image display system 100R. Thus, the image cannot be displayed on the display panel 102. Or, once the link is established, when the link is disconnected due to the influence of noise or the like, the image cannot be displayed on the display panel 102 until the link is again established. In addition, the same applies when a cable disconnects or breaks, or when a portion of the serial interface or the graphic controller 110 breaks down. The state in which an image cannot be displayed as mentioned above is referred herein to as an "undisplayable state."

The conventional timing controller 200R may have a function for displaying any information on the display panel 102 in an undisplayable state. For example, the timing controller 200R stores a preset failsafe display pattern 201. The display pattern 201 is exemplified by a color bar, a monochrome screen, or the like. Then, the timing controller 200R transmits the failsafe display pattern 201 to the source driver 106 as an alternative to the image data from the graphic controller 110 in the undisplayable state.

The present inventors have reviewed the image display system 100R in FIG. 1 and recognized the following problems.

Recently, the shift of replacing mechanical instruments of vehicles such as automobiles with electronic ones, namely display panels, has been promoted. By using the display panels, the degree of freedom of the layout is remarkably increased, and various performances which are impossible by the mechanical type become possible.

The meter panel of the vehicles includes a speedometer, a tachometer, a fuel gauge, various warning lights, and the like. For example, in the case of displaying the speedometer on the display panel, when an undisplayable state occurs, the speed information cannot be presented to the driver.

In the image display system 100R illustrated in FIG. 1, since only the information determined at the design stage can be displayed as the failsafe display pattern 201, it is not possible to present information of high real-time nature such as the speed information.

SUMMARY

Some embodiments of the present disclosure provide a timing controller capable of displaying information of real-time nature on a display panel in an undisplayable state or in a normal state.

According to one embodiment of the present disclosure, there is provided an in-vehicle timing controller. The timing controller includes a main input interface configured to receive input image data from an image processor, an input pin configured to receive a vehicle signal indicating a state of a vehicle from the vehicle, a sub image generator configured to generate sub image data based on the vehicle signal, and an image processing circuit configured to generate output image data to be displayed on a display panel based on at least one of the input image data and the sub image data.

The vehicle signal may be a signal that may be received and accessed without requiring a specific interface (receiver). Alternatively, the vehicle signal may be a signal accessible via an interface such as a controller area network (CAN) or a local interconnect network (LIN). According to the present embodiment, the timing controller can generate sub image data indicating vehicle information based on the vehicle signal without depending on an external processor. Therefore, it is possible to display information of real-time nature on the display panel in an undisplayable state (or a normal state).

The timing controller may include an abnormality detector configured to detect an abnormality. When the abnormality is detected, the sub image generator is enabled. Thus, it is possible to display information of real-time nature on the display panel in an undisplayable state.

The sub image generator may be constantly active. The image processing circuit is configured to generate the output image data by superimposing the sub image data on the input image data. Thus, the timing controller can directly generate the image data by bypassing the processing on the information obtained from the vehicle signal on the vehicle side.

The timing controller may further include a sub input interface configured to receive external control data designating a character to be displayed on the display panel from the image processor or another processor. The sub input interface is independent of the main input interface. When the sub input interface receives the external control data, the sub image generator is configured to generate the sub image data based on the external control data.

The sub input interface may be a serial peripheral interface (SPI) or an inter-integrated circuit ($I^2C$) interface. Since they are widely used interfaces, it is possible to easily implement the same.

The sub image generator may include a memory configured to store a plurality of character data that describes a plurality of characters, an information decoder configured to generate internal control data for designating a character to be displayed on the display panel based on the vehicle signal, and an image decoder configured to read character data corresponding to the character designated by the internal control data from the memory, render the character, and generate the sub image data.

The character may be a segment-type character. The character data may include a plurality of segment data corresponding to a plurality of segments constituting the character. By using the segment-type character, since it becomes unnecessary to store bitmap information of each of a plurality of alphabets and numeric characters, it is sufficient that the memory on the timing controller side is also small in scale. In the present disclosure, the term "segment-type character" includes not only a character such as 16 segments, 14 segments or 7 segments, but also a dot matrix-type character consisting of a plurality of dots.

The vehicle signal may include a vehicle speed signal. The vehicle speed can be said to be the highest priority information to be displayed to the driver in any situation. Meanwhile, many vehicles can easily access a vehicle speed signal indicating a vehicle speed (vehicle speed signal) so that a commercially available general-purpose car navigation system can acquire the vehicle speed. Therefore, by inputting the vehicle speed signal directly to the timing controller, even when an abnormality occurs, the vehicle speed information can be displayed on the display panel.

The vehicle signal may include a voltage of a battery. The vehicle signal may include an output of a thermometer.

The timing controller may further include an output interface configured to output the output image data to a data driver.

According to another embodiment of the present disclosure, there is provided an in-vehicle timing controller. The timing controller may include a main input interface configured to receive input image data from an image processor, an input pin configured to receive a vehicle speed signal from a vehicle, a sub image generator configured to calculate a vehicle speed based on the vehicle speed signal to generate sub image data indicating the calculated vehicle speed, and an image processing circuit configured to generate output image data to be displayed on a display panel based on at least one of the input image data and the sub image data.

The timing controller may be integrated into one semiconductor substrate.

According to another embodiment of the present disclosure, there is provided a vehicle. The vehicle may include the timing controller as described above.

Further, arbitrarily combining the foregoing components or substituting the expressions of the present disclosure with one another among methods, apparatuses and the like is also effective as an embodiment of the present disclosure.

BRIEF DESCRIPTION OF DRAWINGS

FIGS. 5A to 5C are diagrams illustrating a segment-type character.

DETAILED DESCRIPTION

Figure 1:
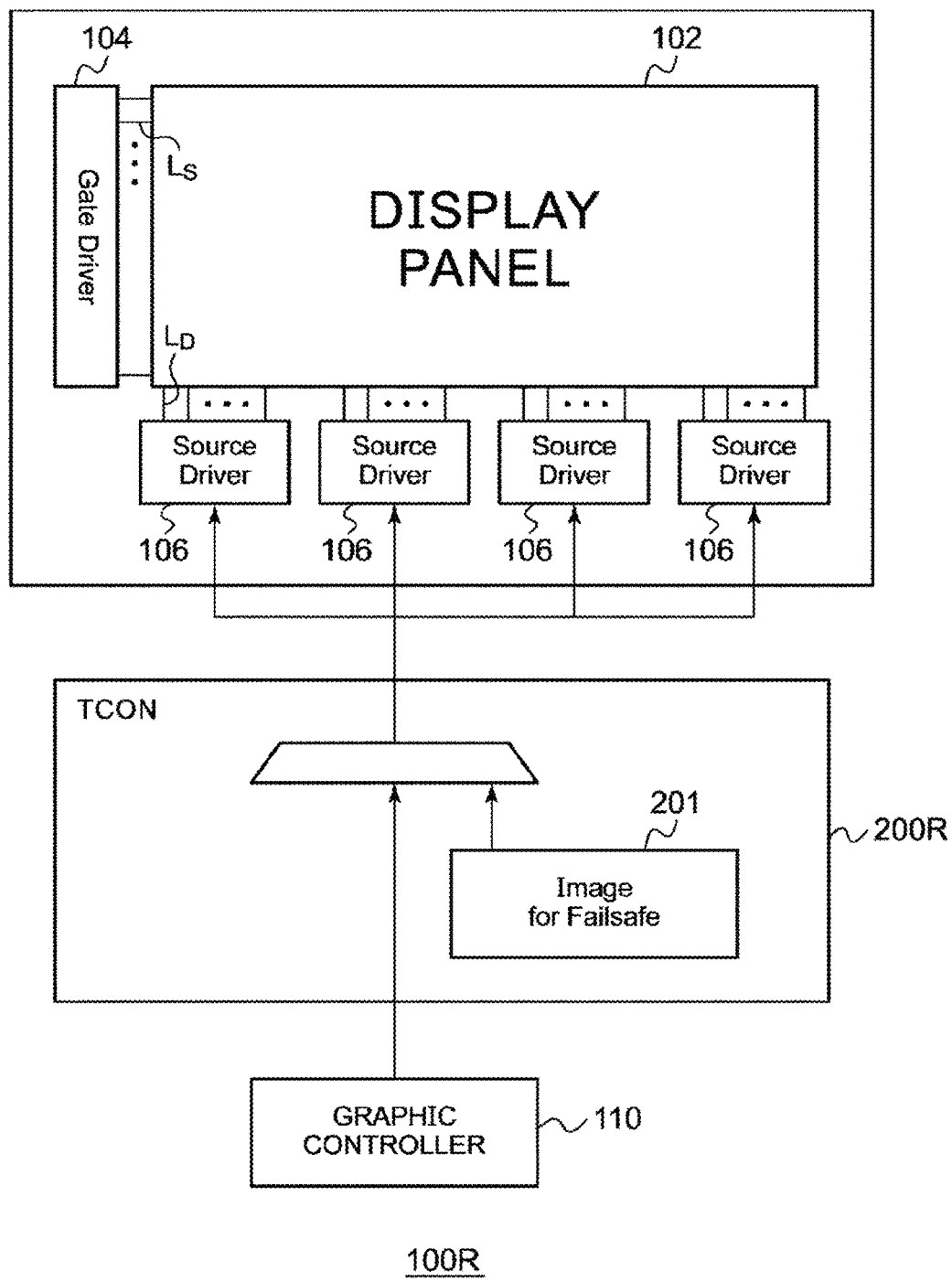
FIG. 1 is a block diagram of an image display system.

Embodiments of the present disclosure will be now described in detail with reference to the drawings. Like or equivalent components, members, and processes illustrated in each drawing are given like reference numerals, and a repeated description thereof will be properly omitted. Further, the embodiments are presented by way of example only, and are not intended to limit the present disclosure, and any feature or combination thereof described in the embodiments may not necessarily be essential to the present disclosure.

In the present disclosure, "a state where a member A is connected to a member B" includes a case where the member A and the member B are physically directly connected or even a case where the member A and the member B are indirectly connected through any other member that does not affect an electrical connection state between the members A and B.

Similarly, "a state where a member C is installed between a member A and a member B" includes a case where the member A and the member C or the member B and the member C are indirectly connected through any other member that does not affect an electrical connection state between the members A and C or the members B and C, in addition to a case where the member A and the member C or the member B and the member C are directly connected.

First Embodiment

Figure 2:
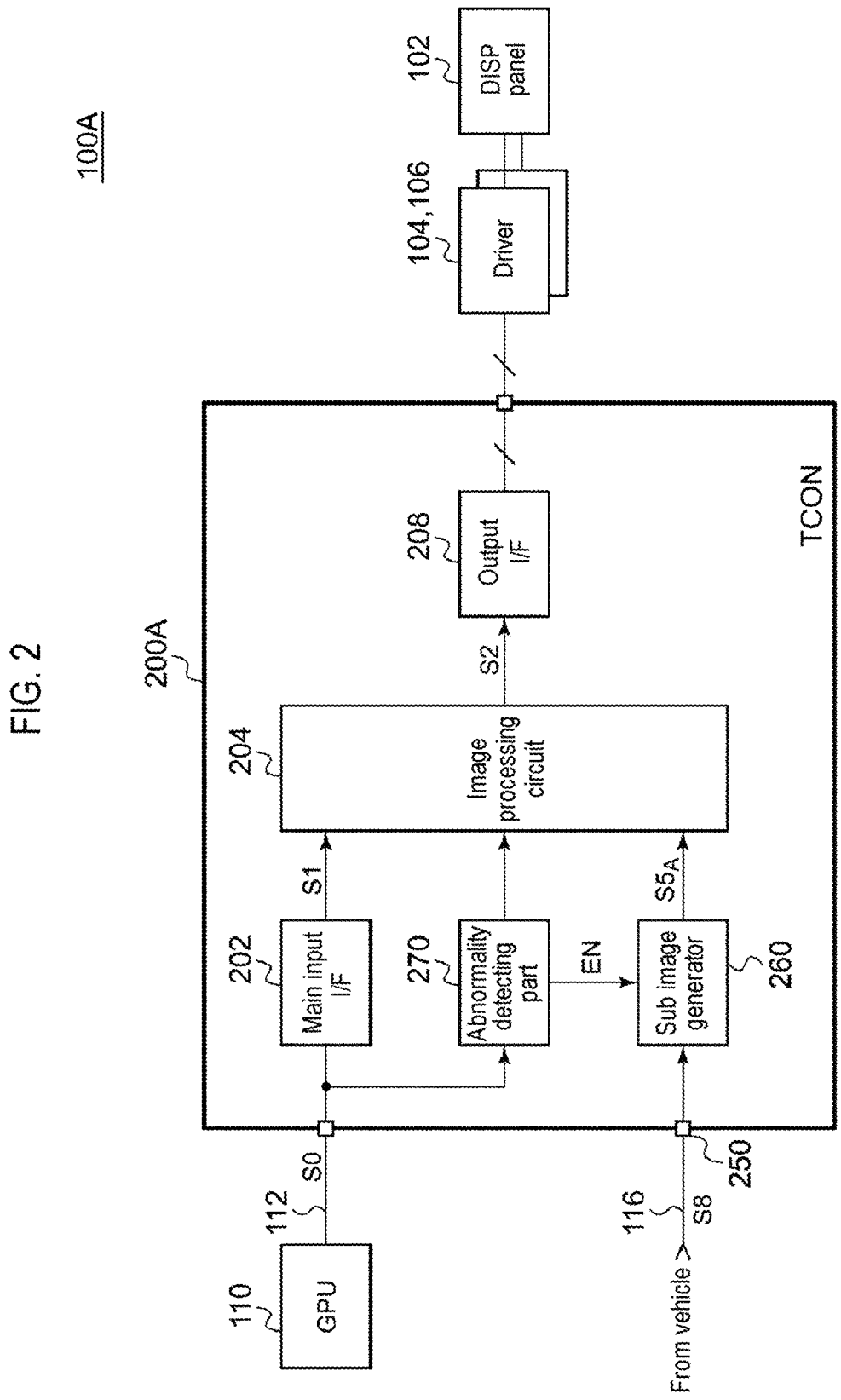
FIG. 2 is a block diagram of an image display system including a timing controller according to a first embodiment of the present disclosure.

FIG. 2 is a block diagram of an image display system 100 A including a timing controller 200A according to a first embodiment of the present disclosure. This timing controller 200A is used for a vehicle and is mounted on a vehicle. A display panel 102 is embedded in an instrument panel (dashboard) on the front of a driver's seat. Instruments for displaying information indispensable for running of the vehicle, such as a speedometer, a tachometer, a fuel gauge, a water temperature gauge, or a range finder, are electronically displayed on the display panel 102. Various warning lamps are also displayed on the display panel 102.

Similar to the image display system 100R in FIG. 1, the timing controller 200A receives input image data S0 from a graphic controller 110, supplies output image data to a source driver 106, and outputs a control signal/a synchronization signal to a gate driver 104 and the source driver 106. The timing controller 200A may be a functional IC integrated into one semiconductor substrate.

The timing controller 200A includes a main input interface 202, an image processing circuit 204, an output interface circuit 208, a sub image generator 260, and an abnormality detecting part 270.

The main input interface 202, the image processing circuit 204, and the output interface circuit 208 are circuit blocks for the display of image data from the graphic controller 110 and may be similar to those installed in the conventional timing controller 200R. The main input interface 202 is connected to the graphic controller 110 via a first line 112 and receives the input image data S0. A differential high-speed serial interface such as low voltage differential signaling (LVDS) may be adopted as an interface between the main input interface 202 and the graphic controller 110.

The image processing circuit 204 performs various signal processing on the input image data S1 received via the main input interface 202. The signal processing of the image processing circuit 204 is not particularly limited, and a known technique may be used. For example, γ correction, frame rate control (FRC) processing, RGB mapping, and the like are exemplified. The output interface circuit 208 outputs output image data S2 processed by the image processing circuit 204 to the source driver 106.

The basic configuration of the timing controller 200A has been described above. The timing controller 200A can display an image (hereinafter, referred to as a sub image) based on a vehicle signal S8 instead of or in addition to an image based on the input image data S1 (hereinafter, referred to as a main image). For the display of the sub image, an input pin 250 and a sub image generator 260 are installed in the timing controller 200A.

A wiring 116 drawn out from the vehicle is connected to the input pin 250. The vehicle signal S8 indicating a state of the vehicle is input to the input pin 250 via the wiring 116. This vehicle signal S8 is correlated with one (referred to as specific information) of the information (vehicle state) to be displayed on the display panel 102. The sub image generator 260 generates sub image data $S5_A$ based on the vehicle signal S8.

The information to be displayed on the display panel 102 is exemplified by a speedometer, a tachometer, a fuel gauge, a water temperature gauge, a range finder, various warnings, a direction indication, and the like, as described above. In the following description, it is assumed that the specific information is, but not limited to, a vehicle speed. In this case, a vehicle speed signal is input to the input pin 250. The vehicle speed signal may be easily extracted in many vehicles.

The image processing circuit 204 generates the output image data S2 to be displayed on the display panel 102 based on at least one of the input image data S1 and the sub image data $S5_A$.

In the present embodiment, the image processing circuit 204 generates the output image data S2 based on the input image data S1 in a normal state, and generates the output image data S2 based on the sub image data $S5_A$ in an abnormal state where the input image data S1 is not received, namely in an undisplayable state.

The timing controller 200A may further include the abnormality detecting part 270. The abnormality detecting part 270 detects an undisplayable state (abnormal state). The abnormality detecting part 270 may detect (i) an abnormal state by monitoring the input image data S0 or S1. Alternatively, the abnormality detecting part 270 may receive a flag indicating an abnormal state from the outside of the timing controller 200A and detect an abnormality based on the flag.

The sub image generator 260 may be switched between an enable state and a disable state, and is disabled (operation stop) in a normal state and enabled when an abnormality is detected.

Figure 3A:
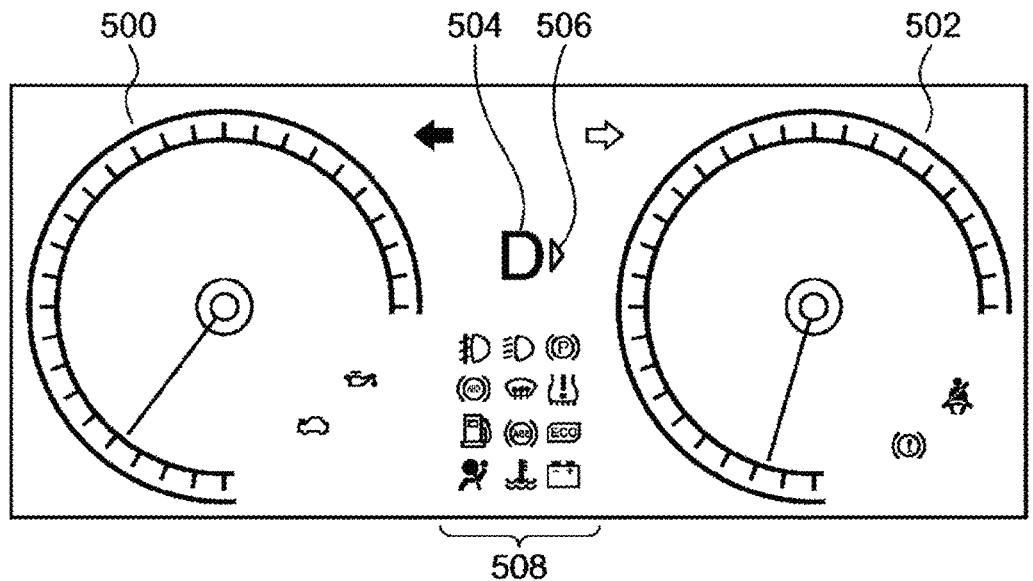
FIGS. 3A and 3B are diagrams illustrating an operation of the timing controller in FIG. 2.
Figure 3B:
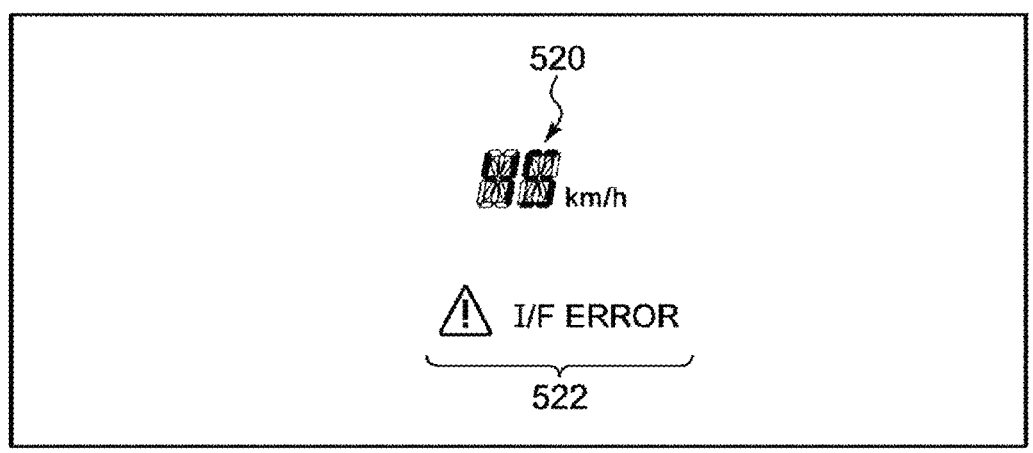

The configuration of the timing controller 200A has been described above. Next, an operation thereof will be described. FIGS. 3A and 3B are diagrams illustrating an operation of the timing controller 200A in FIG. 2.

FIG. 3A illustrates a display screen of the display panel in a normal state. In the normal state, the graphic controller 110 displays main image data including a speedometer 500, a tachometer 502, a shift indicator 504, a direction indication 506, and various warnings 508 on the display panel.

FIG. 3B illustrates a display screen of the display panel in an abnormal state. In the abnormal state, sub image data is displayed on the display panel. The sub image data includes speed information 520 that is specific information and an alert 522 indicating an abnormal state. The sub image data is sufficient if it can simply show the specific information, and may be a combination of specific characters (for example, numerals and alphabets) and specific graphic information (icon).

The operation of the timing controller 200A has been described above.

According to this timing controller 200A, even when the image data cannot be received from the external graphic controller 110, the timing controller 200A can generate the sub image data indicating the specific information based on the vehicle signal and display it on the display panel. Thus, it is possible to provide a failsafe function for the speed display.

The present disclosure is recognized by the block diagram or the circuit diagram of FIG. 2 or intended to cover various devices and circuits derived from the aforementioned description, but is not limited to the specific configuration. Hereinafter, more specific configuration examples or modifications will be described in order to help understand and clarify the essence or circuit operation of the present disclosure, rather than to narrow the scope of the present disclosure.

Figure 4:
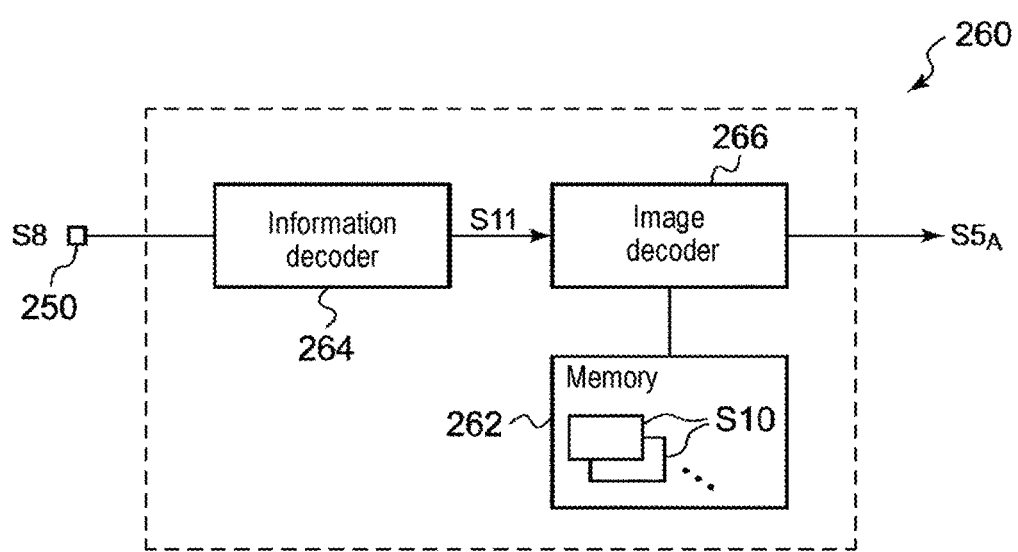
FIG. 4 is a block diagram illustrating a configuration example of a sub image generator of the timing controller.

FIG. 4 is a block diagram illustrating a configuration example of the sub image generator 260 of the timing controller 200A. The sub image generator 260 includes a memory 262, an information decoder 264, and an image decoder 266. The memory 262 stores a plurality of character data S10 describing a plurality of characters. The memory 262 is a non-volatile memory incorporated in the timing controller 200A or externally attached to the timing controller 200A. Alternatively, the memory 262 is a volatile memory, and the character data may be loaded from the external non-volatile memory (not shown) into the memory 262 when the timing controller 200A is activated.

The information decoder 264 generates internal control data S11 designating a character to be displayed on the display panel 102 based on the vehicle signal S8. For example, when the vehicle signal S8 is a vehicle speed signal, the vehicle speed is decoded based on a pulse frequency of the vehicle speed signal. A numerical value of the decoded vehicle speed is the internal control data S11. For example, when it is 80 km/h, the internal control data S11 includes a code designating the numerals 8 and 0.

The image decoder 266 reads the character data S10 corresponding to the character designated by the internal control data S11 from the memory 262, renders the character, and generates sub image data $SS_A$.

An image encoding method of the character is not particularly limited. For example, the character may be in a bitmap (bmp) format and the character data S10 may be bitmap data. In this case, any letter or figure may be expressed by a character.

Alternatively, any letter or figure (character) may be run-length-compressed to generate the character data S10. This makes it possible to save the memory capacity.

A segment-type character may be used for a specific letter such as an alphabet or a numeral. The "segment-type character" includes not only a character such as 16 segments, 14 segments or 7 segments but also a dot matrix-type character consisting of a plurality of dots.

In this case, the character data S10 stored in the memory 262 may include (i) a plurality of segment data describing the shape of a plurality of segments constituting the segment-type character, and (ii) data describing which segment each character includes.

FIGS. 5A to 5C are diagrams illustrating a segment-type character. The segment-type character 800 is represented by a combination of ON/OFF of a plurality of segments 802. In FIG. 5A, a 16-segment-type character is illustrated and convenient identifiers A to P are attached to 16 segments 802. An example of a code showing a 16-segment-type character is illustrated in FIG. 5B. The 16-segment-type character may be represented by 16 bits, i.e., data of 2 bytes. Therefore, when a memory area of 2 bytes is prepared per character, characters or symbols to be displayed may be uniquely designated.

FIG. 5C illustrates an example of a 16-segment-type character. In FIG. 5C, uppercase alphabets, Arabic numerals, and other symbols +, −, #, * are illustrated, but in addition, the characters of lowercase alphabets, Greek numerals, other symbols, Japanese hiragana, katakana, kanji, and other languages may be expressed.

The input image data S1 and the sub image data $S5_A$ generated by the sub image generator 260 are input to the image processing circuit 204. Based on the input image data S1 and the sub image data $S5_A$, the image processing circuit 204 generates the output image data S2 to be displayed on the display panel.

Several modifications may be considered for the processing by the image processing circuit 204 and its configuration.

Figure 6A:
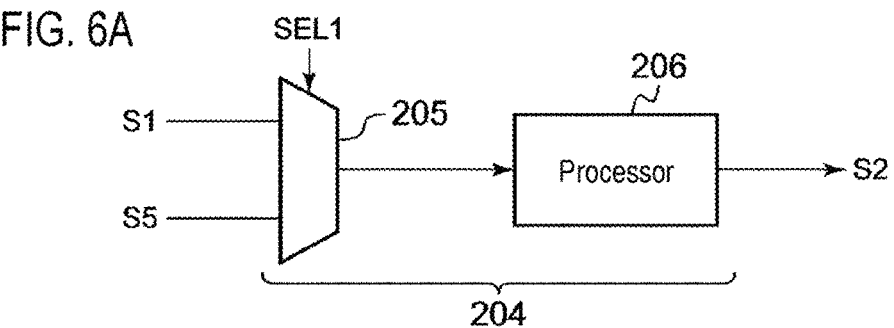
FIGS. 6A and 6B are block diagrams illustrating a configuration example of an image processing circuit.

For example, the image processing circuit 204 may select (i) one of the input image data S1 and the sub image data $S5_A$ and generate the output image data S2. FIG. 6A is a block diagram illustrating a configuration example of the image processing circuit 204. The image processing circuit 204 may include a multiplexer 205 for receiving the input image data S1 and the sub image data $S5_A$ at its input stage and selecting one of them according to a control signal SEL1. A processor 206 at a subsequent stage performs a predetermined signal processing on the image data selected by the multiplexer 205. The image processing circuit 204 may select the sub image data $S5_A$ before the link between the main input interface 202 and the graphic controller 110 is established. Further, when the interface between the main input interface 202 and the graphic controller 110 is broken down, the sub image data $S5_A$ may be selected. When the input image data S1 is normally input, the image processing circuit 204 selects the input image data S1. Alternatively, the image processing circuit 204 may select one of the input image data S1 and the sub image data $S5_A$ based on the control data from the graphic controller 110.

Figure 6B:
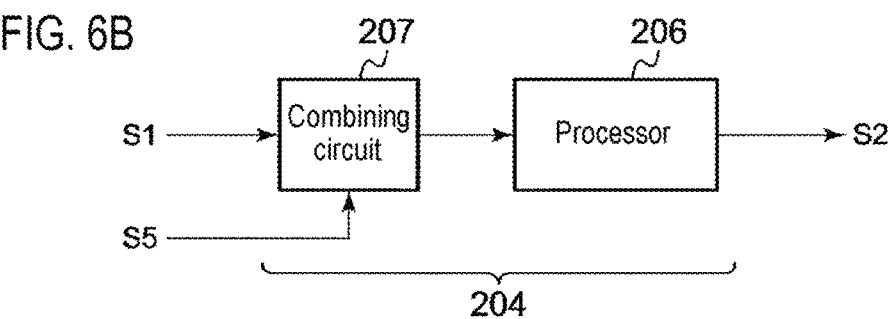

Alternatively, the image processing circuit 204 may superimpose (ii) the input image data S1 and the sub image data $S5_A$ to generate the output image data S2. FIG. 6B is a block diagram illustrating a configuration example of the image processing circuit 204, which may include a combining circuit 207 for superposing the input image data S1 and the sub image data $S5_A$. Processing such as α blending may be used for superimposing the images. Alternatively, the sub image data $S5_A$ may be rendered in a predetermined region, and the input image data S1 may be rendered in other regions. The processor 206 performs a predetermined signal processing on the image combined by the combining circuit 207.

Alternatively, the main input interface 202 may switch between a mode for selecting one of the input image data S1 and the sub image data $S5_A$ and a mode for superimposing them. That is, it may have the functions of both FIG. 6A and FIG. 6B.

Second Embodiment

Figure 7:
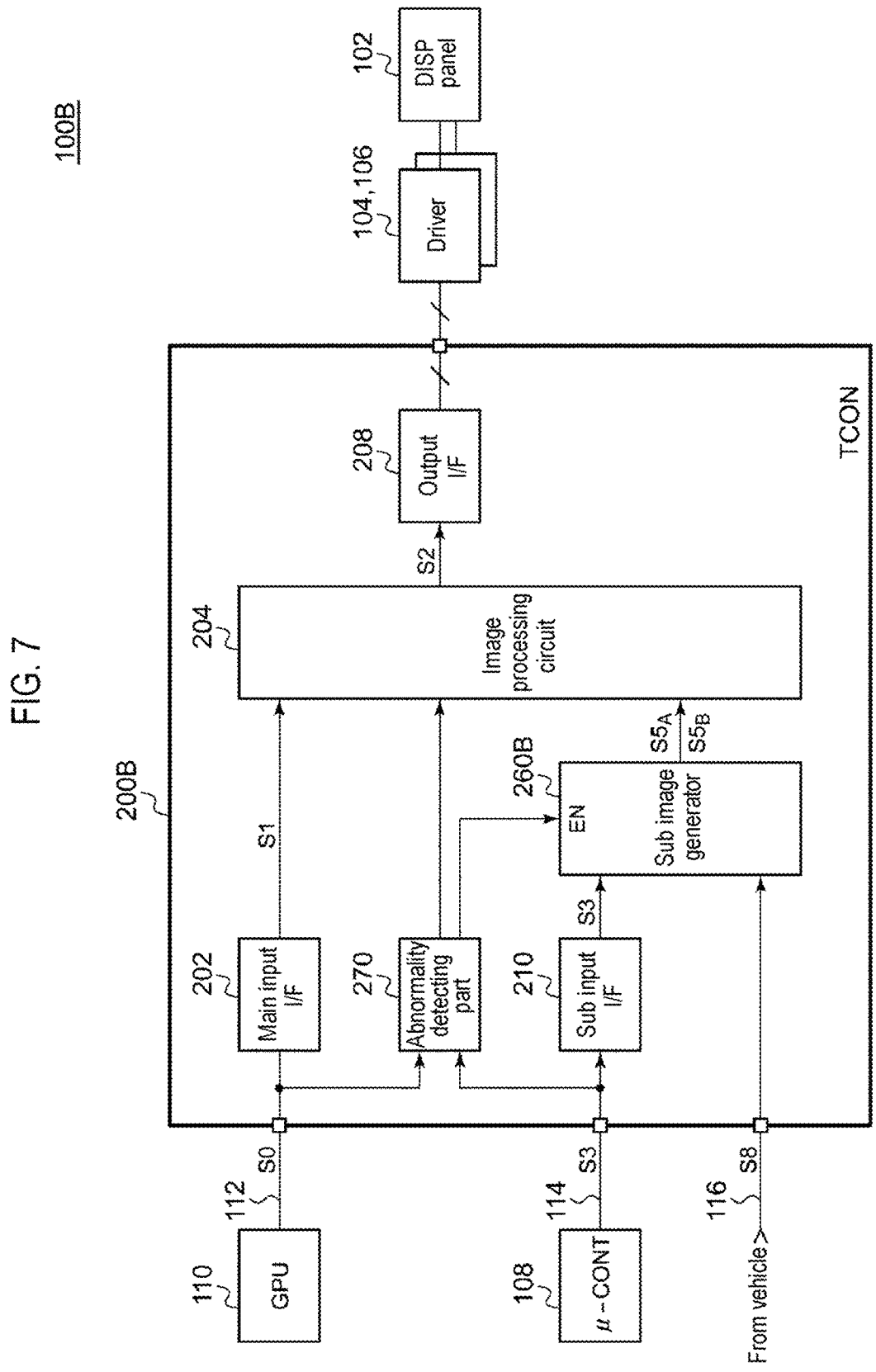
FIG. 7 is a block diagram of an image display system including a timing controller according to a second embodiment of the present disclosure.

FIG. 7 is a block diagram of an image display system 100B including a timing controller 200B according to a second embodiment of the present disclosure.

The image display system 100B includes a microcontroller (external processor) 108 in addition to the image display system 100A of FIG. 2. Using the sub image generation function described in the first embodiment, the microcontroller 108 generates external control data S3 designating a character or the like to be displayed on the display panel 102. In the system in which the microcontroller 108 and the graphic controller 110 are integrated, the external control data S3 and the input image data S0 are generated by the same processor.

The timing controller 200B includes a sub input interface 210. The sub input interface 210 is connected to the microcontroller 108 via a second line 114 and receives the external control data S3. A serial peripheral interface (SPI) or an inter-integrated circuit ($I^2C$) interface may be used as an interface between the timing controller 200B and the microcontroller 108.

In view of the independence of a first line 112 and the second line 114, even in a state in which the first line 112 is broken down or in a state before the link between the main input interface 202 and the graphic controller 110 is established when the system is activated, it should be noted that the sub input interface 210 can receive the external control data S3 from the graphic controller 110.

As in the first embodiment, the sub image generator 260B can generate sub image data $S5_A$ based on a vehicle signal S8. In addition, the sub image generator 260B may generate sub image data $S5_B$ based on the external control data S3 received by the sub input interface 210.

A plurality of information may also be display-controlled by the external control data S3, and one of them may be specific information with which the vehicle signal S8 has a correlation. For example, the external control data S3 may include, in addition to the vehicle speed, the number of revolutions of an engine and the presence or absence of lighting of various warning lamps as the information.

Figure 8:
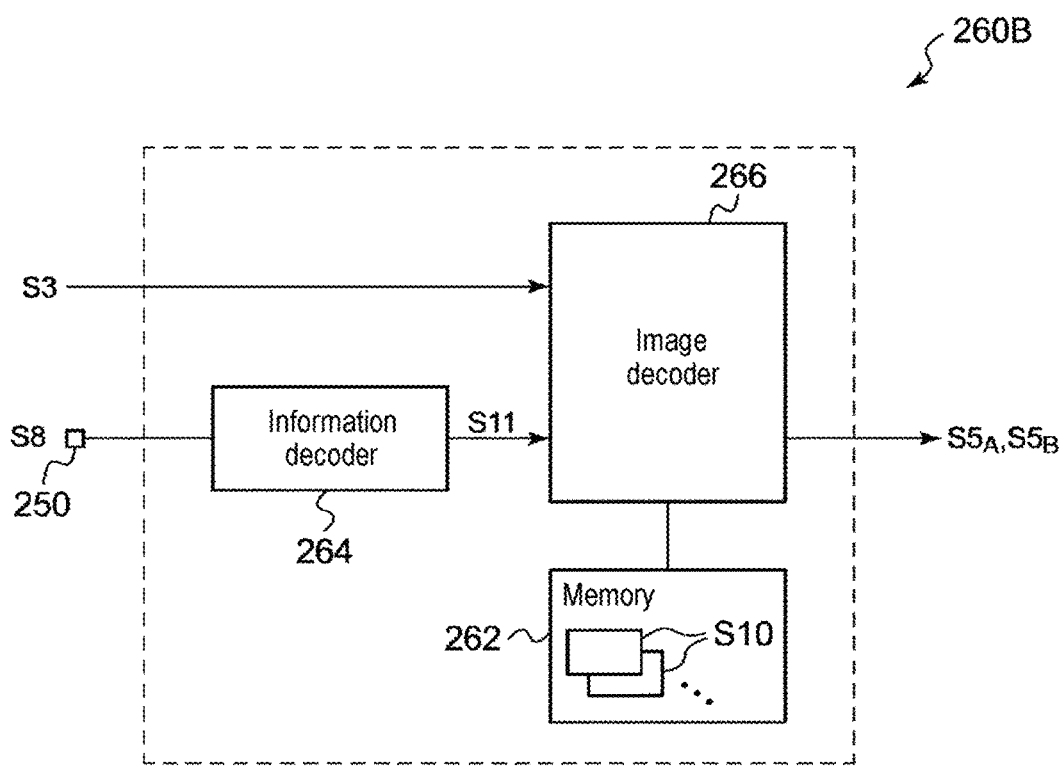
FIG. 8 is a block diagram illustrating a configuration example of a sub image generator of the timing controller.

FIG. 8 is a block diagram illustrating a configuration example of the sub image generator 260B of the timing controller 200B. The sub image generator 260B may be configured like the sub image generator 260 in FIG. 4. The difference is that the external control data S3 is input to the image decoder 266.

The external control data S3 designates a character to be displayed on the display panel 102. Upon receiving the external control data S3, the image decoder 266 reads character data S10 corresponding to the character designated by the external control data S3, and generates the sub image data $S5_B$.

The configuration of the timing controller 200B has been described above. Next, an operation of the timing controller 200B will be described.

Figure 9A:
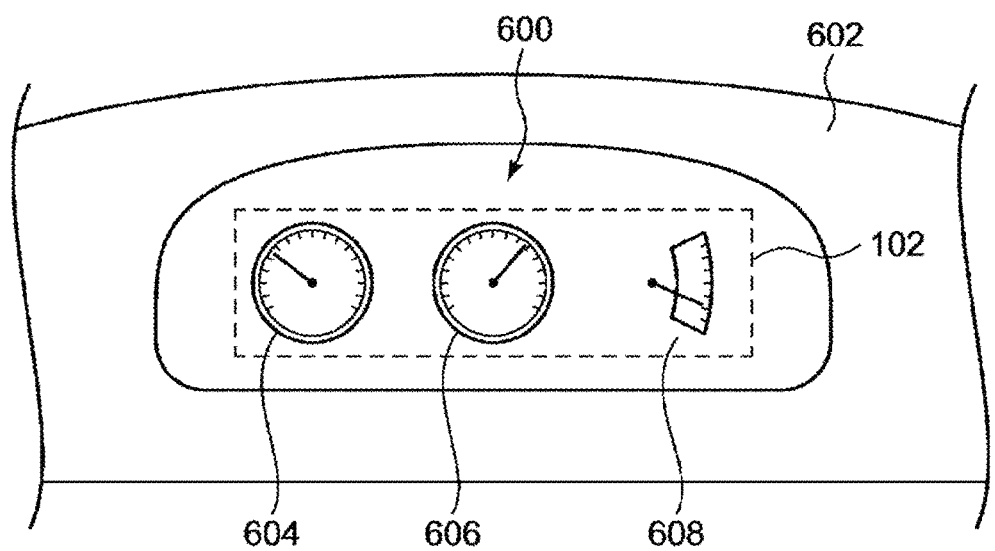
FIGS. 9A and 9B are diagrams illustrating an operation of the timing controller.
Figure 9B:
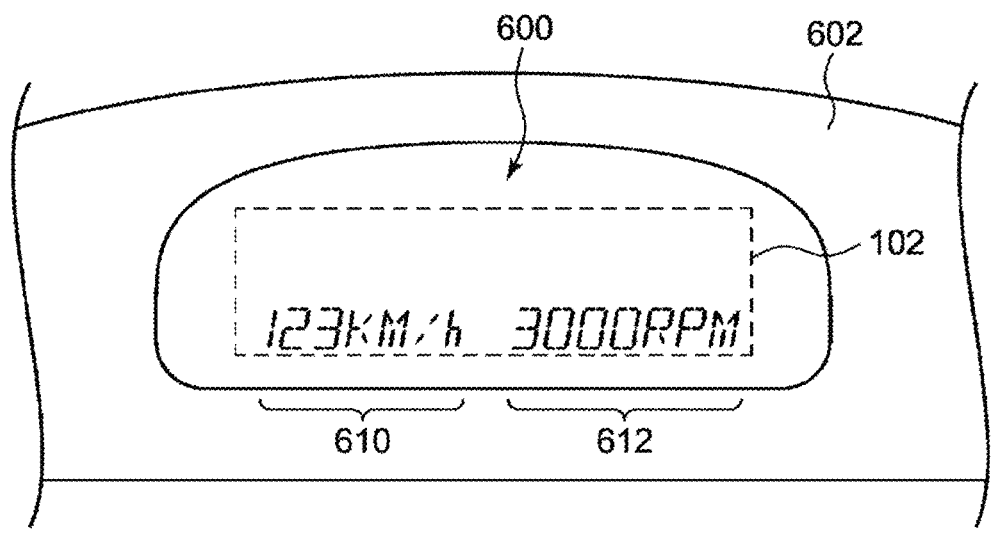

FIGS. 9A and 9B are diagrams illustrating an operation of the timing controller 200B. An in-vehicle display 600 in a normal state is illustrated in FIG. 9A. This in-vehicle display 600 corresponds to the display panel 102 and is embedded in a console panel 602. In the normal state, the input image data S0 generated by the graphic controller 110 includes a speedometer 604, a tachometer 606 indicating the number of revolutions of the engine, a residual amount of fuel 608, a residual amount of a battery in a hybrid vehicle or an electric vehicle, and the like.

FIG. 9B illustrates an image based on the external control data S3. When a situation where the input image data S1 cannot be displayed occurs, the display panel 102 blacks out, causing a trouble in driving.

Therefore, in a situation where the input image data S1 cannot be displayed, the microcontroller 108 generates the external control data S3 including information (for example, a vehicle speed 610, the number of revolutions of the engine 612, the residual amount of fuel, the residual amount of the battery, and the like) for replacing the input image data S1. This makes it possible to display significant information in real time by using the sub image generation function of the timing controller 200B and to enhance the safety.

Alternatively, upon activation of ignition of the vehicle, by providing the external control data S3 including a character string such as "PLEASE WAIT . . . " or the current time to the timing controller 200B until the input image data S1 can be displayed when the image display system 100 is activated, it can be displayed as the sub image data $S5_B$.

The operation of the timing controller 200B has been described above. According to the timing controller 200B, double failsafe can be realized. That is, in the normal state, a main image based on the input image data S0 generated by the graphic controller 110 can be displayed on the display panel 102 (FIG. 9A and FIG. 3A).

Further, when a communication error with the graphic controller 110 occurs, the microcontroller 108 generates the external control data S3 including the information such as the speed, the number of revolutions of the engine or the like, thereby presenting important real-time information to the driver (FIG. 9B).

In addition, when a trouble occurs in the generation or transmission of the external control data S3, the timing controller 200B can continue to present the minimum necessary real-time information based on the vehicle signal S8, without depending on the graphic controller 110 or the microcontroller 108. (FIG. 3B).

The present disclosure has been described above with reference to the embodiments. It is to be understood by those skilled in the art that the embodiments are merely illustrative and may be differently modified by any combination of the components or processes, and the modifications are also within the scope of the present disclosure. Hereinafter, these modifications will be described.

Modification 1

In the embodiments, the sub image data is used for failsafe, but the present disclosure is not limited thereto. For example, the graphic controller 110 may generate the input image data S0 excluding the speedometer 500. The sub image generator 260 is always active (enabled), and may generate the sub image data $S5_A$ indicating the speed information and combine input image data $S_1$ and the sub image data $S5_A$ to generate the output image data S2.

Modification 2

In the embodiments, there has been described a case where the vehicle signal S8 is a vehicle speed signal, but the present disclosure is not limited thereto. For example, the specific information may be information on an in-vehicle battery and the vehicle signal S8 may be a voltage of the battery. The in-vehicle battery may be a starter battery. In the case of a hybrid vehicle or an electric vehicle, a voltage of a lithium ion battery may be monitored. This makes it possible to determine a voltage drop state, a deterioration state, a residual amount, and the like of the battery and to display them as sub images, by the information decoder 264 of the timing controller 200.

Alternatively, the specific information may be a temperature, and the vehicle signal S8 may include an output of a thermometer. This makes it possible to display the temperature of the engine as a sub image.

The number of vehicle signals S8 input to one timing controller 200 may be two or more.

Modification 3

In the embodiments, the timing controller 200 and the source driver 106 are separate chips, but they may be integrated. In this case, the output interface circuit 208 is omitted.

Modification 4

In the embodiments, the vehicle signal S8 is a signal that may be received and accessed without requiring a specific interface (receiver), but it is not limited thereto. The vehicle signal S8 may be a signal accessible via an interface such as a controller area network (CAN) or a local interconnect network (LIN). A transceiver of CAN or LIN in this case should not be confused with the sub input interface 210 described above.

It can be said that the external control data input via the sub input interface 210 is data that directly designates a character to be displayed on the display panel 102. That is, it can be said that, since the microcontroller 108 that generates the external control data S3 knows in advance what kind of information is displayed on the display panel when giving any code, the external control data S3 is generated by being conscious of the internal processing of the microcontroller 108. Meanwhile, the vehicle signal S8 accessible by the interface such as CAN or LIN does not necessarily directly designate a character. Therefore, it can be said that the vehicle signal S8 is generated without being conscious of the internal processing of the microcontroller 108.

The specific information that can be displayed by the sub image generator 260 can be extended by mounting the transceiver such as CAN or LIN on the timing controller 200.

According to an embodiment of the present disclosure, it is possible to display information of real-time nature on a display panel in an undisplayable state or in a normal state.

While certain embodiments have been described, these embodiments have been presented by way of example only, and are not intended to limit the scope of the disclosures. Indeed, the novel methods and apparatuses described herein may be embodied in a variety of other forms; furthermore, various omissions, substitutions and changes in the form of the embodiments described herein may be made without departing from the spirit of the disclosures. The accompanying claims and their equivalents are intended to cover such forms or modifications as would fall within the scope and spirit of the disclosures.

What is claimed is:
1. An in-vehicle timing controller, comprising:
a main input interface configured to receive input image data, which is indicative of first vehicle-state information, from an image processor;

a sub input interface configured to receive display control data, which is indicative of second vehicle-state information, from a micro processor, which is different from the image processor;
an input pin configured to receive a vehicle signal, which is indicative of third vehicle-state information, from a vehicle;
a sub image generator configured to:
   generate, based on the display control data, a first sub image data for displaying the second vehicle-state information on a display panel in real time; and
   generate, based on the vehicle signal, a second sub image data for displaying the third vehicle-state information on the display panel in real time; and
an image processing circuit configured to:
   generate, based on the input image data, output image data to be displayed on the display panel in a normal state where the input image data is received from the image processor;
   generate the output image data, which is indicative of a state of the vehicle, to be displayed on the display panel in real time in a first abnormal state where the input image data is not received from the image processor and the display control data is received from the micro processor; and
   generate the output image data, which is indicative of a state of the vehicle, to be displayed on the display panel in real time in a second abnormal state where the input image data is not received from the image processor and the display control data is not received from the micro processor,
   wherein the output image data in the first abnormal state is different from the output image data in the second abnormal state.

2. The controller of claim 1, further comprising an abnormality detector configured to detect an abnormality,
   wherein, when the abnormality is detected, the sub image generator is enabled.

3. The controller of claim 1, wherein the sub image generator is constantly active, and
   wherein the image processing circuit is configured to generate the output image data by superimposing the second sub image data on the input image data.

4. The controller of claim 1, wherein the sub input interface is a serial peripheral interface (SPI) or an inter-integrated circuit (I²C) interface.

5. The controller of claim 1, wherein the sub image generator includes:
   a memory configured to store a plurality of character data that describes a plurality of characters;
   an information decoder configured to generate control data for designating a character be displayed on the display panel based on the vehicle signal; and
   an image decoder configured to read character data corresponding to the character designated by the control data or the display control data from the memory, render the character, and generate the first sub image data or the second sub image data.

6. The controller of claim 5, wherein the character is a segment-type character, and
   wherein the character data includes a plurality of segment data corresponding to a plurality of segments constituting the character.

7. The controller of claim 1, wherein the vehicle signal includes a vehicle speed signal.

8. The controller of claim 1, wherein the vehicle signal includes a voltage of a battery.

9. The controller of claim 1, wherein the vehicle signal indicates a temperature.

10. The controller of claim 1, further comprising an output interface configured to output the output image data to a data driver.

11. An in-vehicle timing controller, comprising:
   a main input interface configured to receive input image data, which is indicative of first vehicle-state information, from an image processor;
   a sub input interface configured to receive display control data, which is indicative of second vehicle-state information, from a micro processor, which is different from the image processor;
   an input pin configured to receive a vehicle speed signal, which is indicative of third vehicle-state information, from a vehicle;
   a sub image generator configured to:
      generate, based on the display control data, a first sub image data for displaying the second vehicle-state information on a display panel in real time; and
      calculate a vehicle speed based on the vehicle speed signal to generate a second sub image data for displaying the calculated vehicle speed as the third vehicle-state information on the display panel in real time, the sub image generator including:
         a memory configured to store a plurality of character data that describes a plurality of characters;
         an information decoder configured to generate control data for designating a character to be displayed on the display panel by decoding the vehicle speed based on a pulse frequency of the vehicle speed signal; and
         an image decoder configured to read character data corresponding to the character designated by the control data or the display control data from the memory, render the character, and generate the first sub image data or the second sub image data; and
   an image processing circuit configured to:
      generate, based on the input image data output image data to be displayed on the display panel in a normal state where the input image data is received from the image processor;
      generate the output image data, which is indicative of a state of the vehicle, to be displayed on the display panel in real time in a first abnormal state where the input image data is not received from the image processor and the display control data is received from the micro processor; and
      generate the output image data, which is indicative of a state of the vehicle, to be displayed on the display panel in real time in a second abnormal state where the input image data is not received from the image processor and the display control data is not received from the micro processor,
      wherein the output image data in the first abnormal state is different from the output image data in the second abnormal state.

12. The controller of claim 1, herein the controller is integrated into one semiconductor substrate.

13. A vehicle comprising the timing controller of claim 1.

* * * * *